United States Patent
Yamazaki et al.

(10) Patent No.: US 11,525,056 B2
(45) Date of Patent: Dec. 13, 2022

(54) AROMATIC POLYCARBONATE RESIN COMPOSITION AND OPTICAL MOLDED ARTICLE

(71) Applicant: IDEMITSU KOSAN CO., LTD., Tokyo (JP)

(72) Inventors: Yasunobu Yamazaki, Chiba (JP); Takahiro Torii, Chiba (JP); Naoyuki Kawai, Chiba (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 16/634,849

(22) PCT Filed: Jul. 27, 2018

(86) PCT No.: PCT/JP2018/028227
§ 371 (c)(1),
(2) Date: Jan. 28, 2020

(87) PCT Pub. No.: WO2019/026784
PCT Pub. Date: Feb. 7, 2019

(65) Prior Publication Data
US 2020/0216662 A1 Jul. 9, 2020

(30) Foreign Application Priority Data

Jul. 31, 2017 (JP) .............................. JP2017-148436
Sep. 29, 2017 (JP) .............................. JP2017-190777

(51) Int. Cl.
| | |
|---|---|
| C08L 69/00 | (2006.01) |
| C08L 71/02 | (2006.01) |
| C08K 5/1515 | (2006.01) |
| C08K 5/527 | (2006.01) |
| C08G 64/04 | (2006.01) |
| G02B 1/04 | (2006.01) |
| C08K 5/524 | (2006.01) |
| C08K 5/526 | (2006.01) |
| C08K 5/053 | (2006.01) |
| C08K 5/52 | (2006.01) |
| F21V 8/00 | (2006.01) |

(52) U.S. Cl.
CPC ............ *C08L 69/00* (2013.01); *C08G 64/045* (2013.01); *C08K 5/524* (2013.01); *C08K 5/526* (2013.01); *C08L 71/02* (2013.01); *G02B 1/045* (2013.01); *C08K 5/053* (2013.01); *C08K 5/1515* (2013.01); *C08K 5/52* (2013.01); *G02B 6/0011* (2013.01)

(58) Field of Classification Search
None
See application file for complete search history.

(56) References Cited

U.S. PATENT DOCUMENTS

| | | | |
|---|---|---|---|
| 7,553,893 B2 | 6/2009 | Kawato et al. | |
| 9,708,487 B2 | 7/2017 | Takimoto et al. | |
| 2001/0041759 A1* | 11/2001 | Inoue | C08K 3/32 524/145 |
| 2017/0275422 A1* | 9/2017 | Takimoto | C08K 5/526 |
| 2017/0349729 A1* | 12/2017 | Egawa | C08K 5/526 |
| 2020/0010670 A1* | 1/2020 | Torii | C08L 63/00 |

FOREIGN PATENT DOCUMENTS

| | | |
|---|---|---|
| CN | 106795364 A | 5/2017 |
| EP | 1 156 078 A1 | 11/2001 |
| JP | H11-071512 A | 3/1999 |
| JP | H11-158364 A | 6/1999 |
| JP | 2004-051700 A | 2/2004 |
| JP | 2005-112963 A | 4/2005 |
| JP | 4478428 B2 | 6/2010 |
| JP | 2013-231899 A | 11/2013 |
| JP | 2015-180709 A | 10/2015 |
| JP | 5938419 B2 | 6/2016 |
| TW | 201619287 A | 6/2016 |
| WO | WO-2011/083635 A1 | 7/2011 |
| WO | WO-2013/088796 A1 | 6/2013 |
| WO | WO-2015/011994 A1 | 1/2015 |
| WO | WO-2015/068843 A1 | 5/2015 |
| WO | WO-2016/060220 A1 | 4/2016 |
| WO | WO-2016/125625 A1 | 8/2016 |
| WO | WO-2016/194749 A1 | 12/2016 |
| WO | WO2017/212512 * | 12/2017 |

OTHER PUBLICATIONS

NOF Corporation Comprhensive Catalogue (2017) pp. 1-63. (Year: 2017).*

International Searching Authority, "International Search Report," issued in connection with International Patent Application No. PCT/JP2018/028227, dated Sep. 18, 2018.

Office Action dated Nov. 16, 2021 issued in a corresponding Japanese Patent Application No. 2019-534466, (9 pages).

Office Action issued in corresponding Taiwanese Patent Application No. 107126444 dated Feb. 14, 2022 (English translation included).

(Continued)

*Primary Examiner* — David J Buttner
(74) *Attorney, Agent, or Firm* — Foley & Lardner LLP

(57) ABSTRACT

Provided is an aromatic polycarbonate resin composition, including, with respect to 100 parts by mass of an aromatic polycarbonate resin (A), 0.01 part by mass to 0.1 part by mass of an alicyclic epoxy compound (B), 0.2 part by mass to 0.6 part by mass of a polyether compound (C) having a polyoxyalkylene structure, and 0.005 part by mass to 1 part by mass of a phosphorus-based compound (D), wherein a difference between a YI value of a 5-millimeter thick molded body, which is obtained by molding the aromatic polycarbonate resin composition at 320° C., after a lapse of 3,000 hours under an environment at 85° C. and a humidity of 85%, and an initial YI value thereof is 3.0 or less.

16 Claims, No Drawings

(56) References Cited

OTHER PUBLICATIONS

Decision of Refusal issued in corresponding Japanese Patent Application No. 2019-534466 dated May 31, 2022.

* cited by examiner

AROMATIC POLYCARBONATE RESIN COMPOSITION AND OPTICAL MOLDED ARTICLE

CROSS-REFERENCE TO RELATED APPLICATIONS

The present application claims priority under 37 U.S.C. § 371 to International Patent Application No. PCT/JP2018/028227, filed Jul. 27, 2018, which claims priority to and the benefit of Japanese Patent Application Nos. 2017-148436, filed on Jul. 31, 2017, and 2017-190777, filed on Sep. 29, 2017. The contents of these applications are hereby incorporated by reference in their entireties.

TECHNICAL FIELD

The present invention relates to an aromatic polycarbonate resin composition and an optical molded article, and more specifically, to an aromatic polycarbonate resin composition that includes an aromatic polycarbonate resin, that is excellent in initial YI value at the time of its molding, long-term heat resistance, and long-term moist heat resistance, and that is useful in producing an optical molded article, such as a light-guiding plate, and an optical molded article molded by using the composition.

BACKGROUND ART

An aromatic polycarbonate resin is excellent in, for example, transparency, mechanical properties, thermal properties, electrical properties, and weatherability, and has been used in an optical molded article, such as a light-guiding plate, a lens, or an optical fiber, through the utilization of its characteristics. However, each of polycarbonate resins including the aromatic polycarbonate resin involves the following problems. The resin is colored to have a deteriorated color tone, and is reduced in mechanical properties, such as impact resistance, by an influence of its heat deterioration at the time of molding or an influence of its oxidative deterioration at the time of long-term exposure under high temperature. To alleviate those problems, a phosphorus-based compound is typically added as an antioxidant.

In PTL 1, there is a disclosure that a specific amount of an arylphosphine and a specific amount of an alicyclic epoxy compound are incorporated into a polycarbonate resin to improve its long-term heat resistance and long-term moist heat resistance. In PTL 2, there is a disclosure that, when a specific diphosphite compound and a specific alicyclic epoxy compound are incorporated into an aromatic polycarbonate resin, a molded article, such as a light-guiding plate, which is excellent in long-term heat resistance, and hence does not cause any crack even when exposed under a high-temperature and high-humidity environment for a long time period is obtained. In PTL 3, there is a disclosure of a polycarbonate resin composition obtained by incorporating specific amounts of a phosphorus-based compound having an aryl group and a polyether compound into an aromatic polycarbonate resin, the composition being free of reductions in optical characteristics due to its deterioration at the time of molding even when molded in a wide temperature region.

CITATION LIST

Patent Literature

PTL 1: JP 4478428 B2
PTL 2: JP 5938419 B2
PTL 3: WO 2015/068843 A1

SUMMARY OF INVENTION

Technical Problem

In each of the technologies of PTLs 1 to 3, a further improvement has been required in terms of a reduction in initial YI value at the time of molding at a temperature as high as 320° C. In addition, a material that is excellent in heat resistance and moist heat resistance over a time period as long as, for example, 3,000 hours has been required.

The present invention provides an aromatic polycarbonate resin composition that is excellent in initial YI value, long-term heat resistance, and long-term moist heat resistance, and hence can be suitably used in an optical part to be used under a particularly severe environment, such as an on-board light-guiding plate or lens, and an optical part molded out of the composition.

Solution to Problem

The inventors of the present invention have advanced extensive investigations, and as a result, have found that the object can be achieved by setting the contents of an alicyclic epoxy compound, a polyether compound having a polyoxyalkylene structure, and a phosphorus-based compound in a resin composition including an aromatic polycarbonate resin to specific values. Thus, the inventors have completed the present invention.

That is, the present invention provides the following aromatic polycarbonate resin composition and optical molded article.

[1] An aromatic polycarbonate resin composition, comprising, with respect to 100 parts by mass of an aromatic polycarbonate resin (A), 0.01 part by mass to 0.1 part by mass of an alicyclic epoxy compound (B), 0.2 part by mass to 0.6 part by mass of a polyether compound (C) having a polyoxyalkylene structure, and 0.005 part by mass to 1 part by mass of a phosphorus-based compound (D), wherein a difference between a YI value of a 5-millimeter thick molded body, which is obtained by molding the aromatic polycarbonate resin composition at 320° C., after a lapse of 3,000 hours under an environment at 85° C. and a humidity of 85%, and an initial YI value thereof is 3.0 or less.

[2] The aromatic polycarbonate resin composition according to Item [1], wherein the aromatic polycarbonate resin (A) comprises a polycarbonate comprising, in a main chain thereof, a repeating unit represented by the following general formula (I):

wherein $R^{A1}$ and $R^{A2}$ each independently represent an alkyl group having 1 to 6 carbon atoms or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and "a" and "b" each independently represent an integer of from 0 to 4.

[3] The aromatic polycarbonate resin composition according to Item [1] or [2], wherein the aromatic polycarbonate resin (A) has a viscosity-average molecular weight of from 10,000 to 50,000.

[4] The aromatic polycarbonate resin composition according to any one of Items [1] to [3], wherein the alicyclic epoxy compound (B) comprises 3,4-epoxycyclohexylmethyl-3',4'-epoxycyclohexane carboxylate and/or 1,2-epoxy-4-(2-oxiranyl)cyclohexane adduct of 2,2-bis(hydroxymethyl)-1-butanol.

[5] The aromatic polycarbonate resin composition according to any one of Items [1] to [4], wherein the polyether compound (C) comprises a polyoxyalkylene structure represented by $(R^{C1}O)_m$ and a polyoxyalkylene structure represented by $(R^{C2}O)_n$:
wherein $R^{C1}$ and $R^{C2}$ each independently represent an alkylene group having 1 or more carbon atoms, m+n represents 5 or more and 300 or less, in "m" $R^{C1}O$ groups, a plurality of $R^{C1}$s may represent alkylene groups identical to each other, or may represent alkylene groups different from each other in number of carbon atoms, and in "n" $R^{C2}O$ groups, a plurality of $R^{C2}$s may represent alkylene groups identical to each other, or may represent alkylene groups different from each other in number of carbon atoms.

[6] The aromatic polycarbonate resin composition according to Item [5], wherein the $R^{C1}$ and the $R^{C2}$ each represent an alkylene group selected from an ethylene group, a propylene group, and a tetramethylene group, and at least one of the $R^{C1}$ or the $R^{C2}$ represents one of an ethylene group and a propylene group.

[7] The aromatic polycarbonate resin composition according to any one of Items [1] to [6], wherein the polyether compound (C) comprises at least one selected from a polyethylene glycol, a polypropylene glycol, and a polyoxyethylene glycol-polyoxypropylene glycol.

[8] The aromatic polycarbonate resin composition according to any one of Items [1] to [7], wherein the polyether compound (C) has a number-average molecular weight of from 200 to 10,000.

[9] The aromatic polycarbonate resin composition according to any one of Items [1] to [8], wherein the phosphorus-based compound (D) comprises a phosphorus-based compound having a phosphite structure.

[10] The aromatic polycarbonate resin composition according to Item [9], wherein the phosphorus-based compound having a phosphite structure comprises at least one selected from bis(2,4-dicumylphenyl)pentaerythritol diphosphite, bis (2,6-di-tert-butyl-4-methylphenyl)pentaerythritol diphosphite, and tris(2,4-di-tert-butylphenyl) phosphite.

[11] The aromatic polycarbonate resin composition according to any one of Items [1] to [10], wherein the initial YI value of the 5-millimeter thick molded body molded at 320° C. is 1.1 or less.

[12] The aromatic polycarbonate resin composition according to any one of Items [1] to [11], wherein a difference between a YI value of the 5-millimeter thick molded body molded at 320° C. after a lapse of 3,000 hours at 120° C. and the initial YI value thereof is 4.0 or less.

[13] The aromatic polycarbonate resin composition according to any one of Items [1] to [12], wherein the aromatic polycarbonate resin composition comprises, with respect to 100 parts by mass of the aromatic polycarbonate resin (A), 0.02 part by mass to 0.05 part by mass of the alicyclic epoxy compound (B), 0.2 part by mass to 0.5 part by mass of the polyether compound (C) having a polyoxyalkylene structure, and 0.02 part by mass to 0.3 part by mass of the phosphorus-based compound (D).

[14] The aromatic polycarbonate resin composition according to any one of Items [1] to [13], wherein the aromatic polycarbonate resin composition comprises, with respect to 100 parts by mass of the aromatic polycarbonate resin (A), 0.03 part by mass to 0.08 part by mass of the alicyclic epoxy compound (B).

[15] The aromatic polycarbonate resin composition according to any one of Items [1] to [14], further comprising 0.01 part by mass to 0.05 part by mass of glycerin monostearate with respect to 100 parts by mass of the aromatic polycarbonate resin (A).

[16] An optical molded article, which is obtained by molding the aromatic polycarbonate resin composition of any one of Items [1] to [15].

[17] The optical molded article according to Item [16], wherein the optical molded article comprises a light-guiding plate.

[18] The optical molded article according to Item [16] or [17], wherein the optical molded article has a thickness of from 1 mm to 70 mm.

Advantageous Effects of Invention

The molded body formed of the aromatic polycarbonate resin composition of the present invention is excellent in initial YI value, long-term heat resistance, and long-term moist heat resistance. The molded body is suitable as optical molded articles, such as a light-guiding part for a vehicle and various light-guiding plates.

DESCRIPTION OF EMBODIMENTS

An aromatic polycarbonate resin composition of the present invention includes, with respect to 100 parts by mass of an aromatic polycarbonate resin (A), 0.01 part by mass to 0.1 part by mass of an alicyclic epoxy compound (B), 0.2 part by mass to 0.6 part by mass of a polyether compound (C) having a polyoxyalkylene structure, and 0.005 part by mass to 1 part by mass of a phosphorus-based compound (D), wherein a difference between a YI value of a 5-millimeter thick molded body, which is obtained by molding the aromatic polycarbonate resin composition at 320° C., after a lapse of 3,000 hours under an environment at 85° C. and a humidity of 85%, and an initial YI value thereof is 3.0 or less.

The aromatic polycarbonate resin composition and optical molded article of the present invention are described in detail below. In this description, a specification considered to be preferred may be arbitrarily adopted, and a combination of preferred specifications is more preferred.

[Aromatic Polycarbonate Resin Composition]
<(A) Aromatic Polycarbonate Resin>

The aromatic polycarbonate resin composition of the present invention includes the aromatic polycarbonate resin (A). A resin produced by a known method may be used as the aromatic polycarbonate resin (A) without any particular limitation.

For example, a resin produced from a dihydric phenol and a carbonate precursor by a solution method (interfacial polycondensation method) or a melting method (ester exchange method), i.e., a resin produced by the interfacial polycondensation method involving causing the dihydric phenol and phosgene to react with each other in the presence of an end terminator, or by causing the dihydric phenol and diphenyl carbonate or the like to react with each other in the presence of the end terminator according to the ester exchange method or the like may be used.

Examples of the dihydric phenol may include various dihydric phenols, in particular, 2,2-bis(4-hydroxyphenyl) propane [bisphenol A], bis(4-hydroxyphenyl)methane, 1,1-bis(4-hydroxyphenyl)ethane, 2,2-bis(4-hydroxy-3,5-dimethylphenyl)propane, 4,4'-dihydroxydiphenyl, a bis(4-hydroxyphenyl)cycloalkane, bis(4-hydroxyphenyl) oxide, bis(4-hydroxyphenyl) sulfide, bis(4-hydroxyphenyl) sulfone, bis(4-hydroxyphenyl) sulfoxide, and bis(4-hydroxyphenyl) ketone. In addition, examples thereof may also include hydroquinone, resorcin, and catechol. Those dihydric phenols may be used alone or in combination thereof. Among them, bis(hydroxyphenyl)alkane-based phenols are preferred, and bisphenol A is particularly suitable. The use of bisphenol A as the dihydric phenol provides a polycarbonate resin having a bisphenol A structure.

The carbonate precursor is, for example, a carbonyl halide, a carbonyl ester, or a haloformate, and is specifically phosgene, a dihaloformate of a dihydric phenol, diphenyl carbonate, dimethyl carbonate, diethyl carbonate, or the like.

The component (A) in the present invention may have a branched structure. A branching agent may be exemplified by 1,1,1-tris(4-hydroxyphenyl)ethane, α,α',α"-tris(4-hydroxyphenyl)-1,3,5-triisopropylbenzene, phloroglucin, trimellitic acid, or 1,3-bis(o-cresol).

A monovalent carboxylic acid or a derivative thereof or a monohydric phenol may be used as the end terminator. Examples thereof may include p-tert-butylphenol, p-phenylphenol, p-cumylphenol, p-perfluorononylphenol, p-(perfluorononylphenyl)phenol, p-(perfluorohexylphenyl)phenol, p-tert-perfluorobutylphenol, 1-(p-hydroxybenzyl)perfluorodecane, p-[2-(1H, 1H-perfluorotridodecyloxy)-1,1,1,3,3,3-hexafluoropropyl]phenol, 3,5-bis(perfluorohexyloxycarbonyl)phenol, perfluorododecyl p-hydroxybenzoate, p-(1H, 1H-perfluorooctyloxy)phenol, 2H,2H,9H-perfluorononanoic acid, and 1,1,1,3,3,3-hexafluoro-2-propanol.

It is preferred that the aromatic polycarbonate resin (A) include a polycarbonate resin including, in a main chain thereof, a repeating unit represented by the following general formula (I):

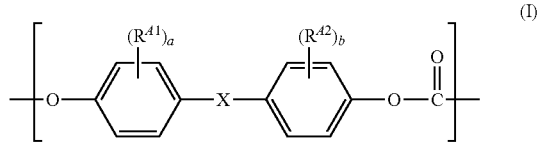

(I)

wherein $R^{41}$ and $R^{42}$ each independently represent an alkyl group having 1 to 6 carbon atoms or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and "a" and "b" each independently represent an integer of from 0 to 4.

Examples of the alkyl group represented by each of $R^{41}$ and $R^{42}$ include a methyl group, an ethyl group, a n-propyl group, an isopropyl group, various butyl groups (the term "various" means that a linear group and various branched groups are included, and the same holds true for the following), various pentyl groups, and various hexyl groups.

An example of the alkoxy group represented by each of $R^{41}$ and $R^{42}$ is an alkoxy group whose alkyl group moiety is the alkyl group described above.

$R^{41}$ and $R^{42}$ each preferably represent an alkyl group having 1 to 4 carbon atoms or an alkoxy group having 1 to 4 carbon atoms.

Examples of the alkylene group represented by X include a methylene group, an ethylene group, a trimethylene group, a tetramethylene group, and a hexamethylene group. Among them, an alkylene group having 1 to 5 carbon atoms is preferred. Examples of the alkylidene group represented by X include an ethylidene group and an isopropylidene group. Examples of the cycloalkylene group represented by X include a cyclopentanediyl group, a cyclohexanediyl group, and a cyclooctanediyl group. Among them, a cycloalkylene group having 5 to 10 carbon atoms is preferred. Examples of the cycloalkylidene group represented by X include a cyclohexylidene group, a 3,5,5-trimethylcyclohexylidene group, and a 2-adamantylidene group. Among them, a cycloalkylidene group having 5 to 10 carbon atoms is preferred, and a cycloalkylidene group having 5 to 8 carbon atoms is more preferred.

Symbols "a" and "b" each independently represent an integer of from 0 to 4, preferably from 0 to 2, more preferably 0 or 1.

In the present invention, the aromatic polycarbonate resin (A) preferably contains a polycarbonate resin having a bisphenol A structure from the viewpoints of, for example, the transparency, mechanical characteristics, and thermal characteristics of a molded body to be obtained. The polycarbonate resin having a bisphenol A structure is specifically, for example, such a resin that X in the general formula (I) represents an isopropylidene group. The content of the polycarbonate resin having a bisphenol A structure in the aromatic polycarbonate resin (A) is preferably from 50 mass % to 100 mass %, more preferably from 75 mass % to 100 mass %, still more preferably from 85 mass % to 100 mass %.

In the present invention, the viscosity-average molecular weight (Mv) of the aromatic polycarbonate resin (A) is typically from 10,000 to 50,000, preferably from 13,000 to 35,000, more preferably from 14,000 to 20,000.

In the present invention, the viscosity-average molecular weight (Mv) is calculated from the following equation after the determination of a limiting viscosity [η] through the measurement of the viscosity of a methylene chloride solution at 20° C. with an Ubbelohde-type viscometer.

$$[\eta]=1.23\times10^{-5}\times Mv^{0.83}$$

<Alicyclic Epoxy Compound (B)>

The aromatic polycarbonate resin composition of the present invention includes the alicyclic epoxy compound (B). The alicyclic epoxy compound (B) has an action as an acid scavenger. When the aromatic polycarbonate resin composition is exposed to a high-temperature environment for a long time period, or is exposed to a high-humidity and high-temperature environment for a long time period, the following problem occurs. An acidic compound is produced by an influence of a component derived from each component in the aromatic polycarbonate resin composition or from an impurity of each component therein. The produced acidic compound deteriorates the color tone of the aromatic polycarbonate resin composition to reduce its transparency. The alicyclic epoxy compound (B) scavenges the produced acidic compound, and hence such adverse effect can be avoided. In the present invention, the alicyclic epoxy compound (B) refers to a cyclic aliphatic compound having an epoxy group obtained by the addition of one oxygen atom to an ethylene bond in an aliphatic ring thereof, and specifically, compounds listed in the following formulae (1) to (10) may each be used. The alicyclic epoxy compounds (B) may be used alone or in combination thereof.

(1)
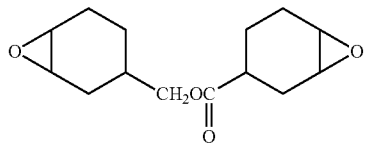

(2)
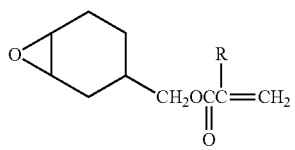
(R: H or CH$_3$)

(3)
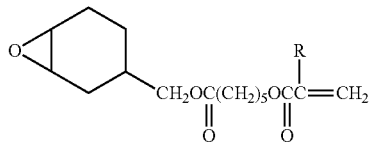
(R: H or CH$_3$)

(4)
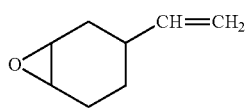

(5)
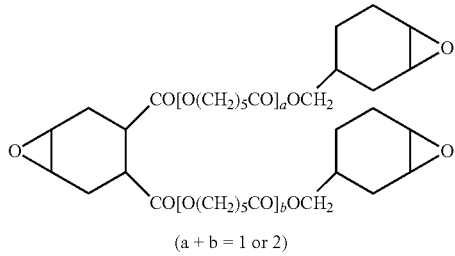
(a + b = 1 or 2)

(6)
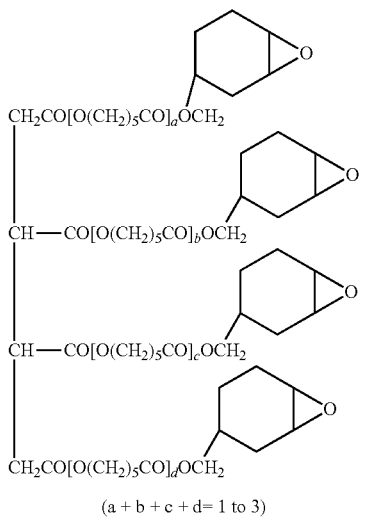
(a + b + c + d = 1 to 3)

(7)
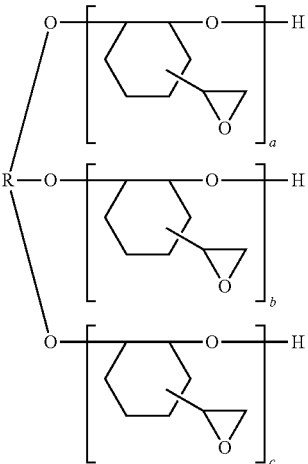
(a + b + c + n (integer), R: a hydrocarbon group)

(8)
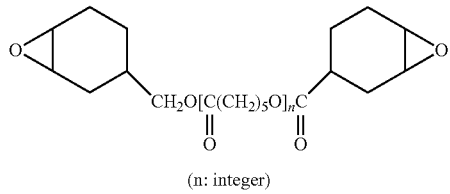
(n: integer)

(9)
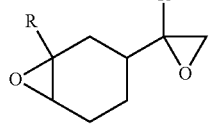
(R: a hydrocarbon group)

(10)
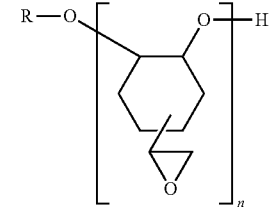
(R: a hydrocarbon group, n: integer)

Among the alicyclic epoxy compounds, the compounds represented by the formula (1), the formula (7), and the formula (10) are preferred, and in particular, 3,4-epoxycyclohexylmethyl-3',4'-epoxycyclohexane carboxylate (a commercial product thereof is, for example, a product available under the product name "CELLOXIDE 2021P" from Daicel Chemical Industries, Ltd.), 1,2-epoxy-4-(2-oxiranyl)cyclohexane adduct of 2,2-bis(hydroxymethyl)-1-butanol (a commercial product thereof is, for example, a product available under the product name "EHPE 3150" from Daicel Chemical Industries, Ltd.), and a mixture of the two materials (a commercial product thereof is, for example, a product available under the product name "EHPE 3150CE" from Daicel Chemical Industries, Ltd.) are suitable.

The content of the alicyclic epoxy compound (B) is from 0.01 part by mass to 0.1 part by mass, preferably from 0.01 part by mass to 0.08 part by mass, more preferably from 0.02 part by mass to 0.05 part by mass with respect to 100 parts by mass of the aromatic polycarbonate resin (A). When the content is less than 0.01 part by mass, the YI value of a molded article of the polycarbonate resin composition increases at the time of its holding under high temperature or at the time of its holding at high humidity, and hence the color tone of the polycarbonate resin composition reduces. When the content is 0.01 part by mass or more, the YI value of the molded article is low even at the time of the holding under high temperature or after the holding at high humidity, and hence the color tone of the polycarbonate resin composition becomes excellent. The content is preferably more than 0.02 part by mass, more preferably 0.03 part by mass or more. When the content of the alicyclic epoxy compound (B) is more than 0.1 part by mass, the YI value of the molded article increases at the time of its long-term holding under high temperature, and hence the color tone of the polycarbonate resin composition reduces. Accordingly, the content of the alicyclic epoxy compound (B) is preferably 0.1 part by mass or less, more preferably 0.08 part by mass or less, still more preferably 0.05 part by mass or less. As a range in which a particularly excellent color tone can be maintained even when the molded article is held under high temperature or held at high humidity, the content of the alicyclic epoxy compound (B) with respect to 100 parts by mass of the aromatic polycarbonate resin (A) is preferably set to from 0.03 part by mass to 0.08 part by mass. A case in which an optical molded article, such as a light-guiding plate, is produced by using the aromatic polycarbonate resin composition reduced in color tone is not preferred because the transparency of the molded article is adversely affected.

<Polyether Compound (C) Having Polyoxyalkylene Structure>

The aromatic polycarbonate resin composition of the present invention includes the polyether compound (C) having a polyoxyalkylene structure. The polyether compound (C) is used for improving an initial color tone at the time of the molding of the aromatic polycarbonate resin composition. The polyether compound (C) having a polyoxyalkylene structure preferably has a polyoxyalkylene structure represented by $(R^{C1}O)_m$ and a polyoxyalkylene structure represented by $(R^{C2}O)_n$. In the formulae, $R^{C1}$ and $R^{C2}$ each independently represent an alkylene group having 1 or more carbon atoms, and m+n represents 5 or more and less than 300, preferably from 10 to 200, more preferably from 20 to 100.

Examples of the alkylene group represented by each of $R^{C1}$ and $R^{C2}$ include a methylene group, an ethylene group, a trimethylene group, a propylene group, a tetramethylene group, and a hexamethylene group. Among them, an alkylene group having 1 to 5 carbon atoms is preferred.

In "m" $R^{C1}O$ groups, a plurality of $R^{C1}$s may represent alkylene groups identical to each other, or may represent alkylene groups different from each other in number of carbon atoms. That is, a polyoxyalkylene group represented by $(R^{C1}O)_m$ is not limited to a group having a single oxyalkylene unit as a repeating unit, such as a polyoxyethylene group or a polyoxypropylene group, and may be a group having a plurality of oxyalkylene units different from each other in number of carbon atoms, such as an oxyethylene unit and an oxypropylene unit, as repeating units.

The same description as that of $R^{C1}$ holds true for $R^{C2}$, and in "n" $R^{C2}O$ groups, a plurality of $R^{C2}$s may represent alkylene groups identical to each other, or may represent alkylene groups different from each other in number of carbon atoms.

From the viewpoint of improving the initial color tone, it is particularly preferred that $R^{C1}$ and $R^{C2}$ each represent an alkylene group selected from an ethylene group, a propylene group, and a tetramethylene group among the alkylene groups represented by $R^{C1}$ and $R^{C2}$, and at least one of $R^{C1}$ or $R^{C2}$ represent one of an ethylene group and a propylene group.

The polyether compound (C) is preferably at least one selected from the group consisting of a compound (C-1) represented by the following general formula (II), an alkylene oxide adduct of a polyhydric alcohol and an ester thereof (C-2), and a cyclic polyether compound (C-3):

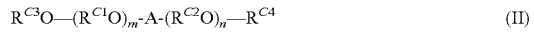

$$R^{C3}O-(R^{C1}O)_m\text{-A-}(R^{C2}O)_n-R^{C4} \qquad (II)$$

wherein $R^{C1}$ and $R^{C2}$ each independently represent an alkylene group having 1 or more carbon atoms, m+n represents 5 or more and less than 300, $R^{C3}$ and $R^{C4}$ each independently represent a hydrogen atom, a hydrocarbon group having 1 to 30 carbon atoms, an alkanoyl group having 1 to 30 carbon atoms, an alkenoyl group having 2 to 30 carbon atoms, or a glycidyl group, and A represents a single bond or a divalent organic group.

The alkylene group represented by each of $R^{C1}$ and $R^{C2}$ is as described above. The polyoxyalkylene structure represented by $(R^{C1}O)_m$ and the polyoxyalkylene structure represented by $(R^{C2}O)_n$ are also as described above.

Examples of the hydrocarbon group having 1 to 30 carbon atoms represented by each of $R^{C3}$ and $R^{C4}$ include an alkyl group having 1 to 30 carbon atoms, an alkenyl group having 2 to 30 carbon atoms, an aryl group having 6 to 30 carbon atoms, and an aralkyl group having 7 to 30 carbon atoms.

Each of the alkyl group and the alkenyl group may be linear, branched, or cyclic. Examples thereof include a methyl group, an ethyl group, a n-propyl group, an isopropyl group, various butyl groups, various pentyl groups, various hexyl groups, various octyl groups, a cyclopentyl group, a cyclohexyl group, an allyl group, a propenyl group, various butenyl groups, various hexenyl groups, various octenyl groups, a cyclopentenyl group, and a cyclohexenyl group. Examples of the aryl group include a phenyl group, a tolyl group, and a xylyl group. Examples of the aralkyl group include a benzyl group, a phenethyl group, and a methylbenzyl group.

The alkanoyl group having 1 to 30 carbon atoms represented by each of $R^{C3}$ and $R^{C4}$ may be linear or branched, and examples thereof include a methanoyl group, an ethanoyl group, a n-propanoyl group, an isopropanyl group, a n-butanoyl group, a tert-butanoyl group, a n-hexanoyl group, a n-octanoyl group, a n-decanoyl group, a n-dodecanoyl group, and a benzoyl group. Among them, an alkanoyl group having 1 to 20 carbon atoms is preferred from the viewpoints of the compatibility, heat stability, and ease of production of the composition.

The alkenoyl group having 2 to 30 carbon atoms represented by each of $R^{C3}$ and $R^{C4}$ may be linear or branched, and examples thereof include an ethenoyl group, a n-propenoyl group, an isopropenoyl group, a n-butenoyl group, a tert-butenoyl group, a n-hexenoyl group, a n-octenoyl group, a n-decenoyl group, and a n-dodecenoyl group. Among them, an alkenoyl group having 2 to 10 carbon atoms is preferred, and an alkenoyl group having 2 to 6 carbon atoms is more preferred from the viewpoint that the molecular weight of the composition is reduced, from the viewpoints of its compatibility and solubility, and from the viewpoint of its ease of production.

The divalent organic group represented by A is, for example, a group represented by the following formula (a).

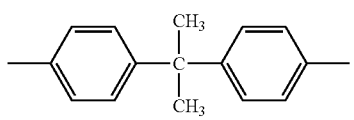
(a)

Specific examples of the compound (C-1) represented by the general formula (II) include polyethylene glycol, polypropylene glycol, polytetramethylene glycol, polyoxytetramethylene polyoxyethylene glycol, polyoxyethylene polyoxypropylene glycol, polyoxyethylene monomethyl ether, polyoxyethylene dimethyl ether, polyoxyethylene-bisphenol A ether, polyoxypropylene-bisphenol A ether, polyoxyethylene-polyoxypropylene-bisphenol A ether, polyethylene glycol-allyl ether, polyethylene glycol-diallyl ether, polypropylene glycol-allyl ether, polypropylene glycol-diallyl ether, polyethylene glycol-polypropylene glycol-allyl ether, polyethylene glycol dimethacrylate, polypropylene glycol dimethacrylate, and polypropylene glycol distearate. Those compounds are available as commercial products, and for example, "UNIOX (trademark)", "UNIOL (trademark)", "UNILUB (trademark)", "UNISAFE (trademark)", "POLYCERIN (trademark)", or "EPIOL (trademark)", which is manufactured by NOF Corporation, may be used.

In the alkylene oxide adduct of a polyhydric alcohol and the ester thereof (C-2), examples of the polyhydric alcohol include glycerin, diglyceryl ether, and sorbitol.

Specific examples of the cyclic polyether compound (C-3) include 18-crown-6 and dibenzo-18-crown-6.

At least one selected from a polyethylene glycol, a polypropylene glycol, and a polyoxyethylene glycol-polyoxypropylene glycol is preferably used as the polyether compound (C).

The number-average molecular weight of the polyether compound (C) is not particularly limited, but is preferably from 200 to 10,000, more preferably from 500 to 8,000, still more preferably from 1,000 to 5,000.

The content of the polyether compound (C) is from 0.2 part by mass to 0.6 part by mass, preferably from 0.2 part by mass to 0.5 part by mass, more preferably from 0.3 part by mass to 0.5 part by mass with respect to 100 parts by mass of the aromatic polycarbonate resin (A). When the content of the polyether compound (C) is less than 0.2 part by mass, the initial YI value of the molded body of the aromatic polycarbonate-based resin composition reduces. A case in which the content of the polyether compound (C) is more than 0.6 part by mass is not preferred because of the following reason. The YI value of the molded article formed of the aromatic polycarbonate-based resin composition increases at the time of the holding of the molded article under high temperature or at the time of the holding thereof at high humidity, and hence the color tone of the composition reduces. Accordingly, transparency in the case of an optical molded article application, such as a light-guiding plate, is adversely affected.

<Phosphorus-Based Compound (D)>

The aromatic polycarbonate resin composition of the present invention includes the phosphorus-based compound (D). The incorporation of the phosphorus-based compound (D) can make the initial YI value, long-term heat resistance, and long-term moist heat resistance of the aromatic polycarbonate resin composition of the present invention satisfactory. Accordingly, the color tone of the resin composition becomes satisfactory, and hence an optical molded article having excellent transparency, such as a light-guiding plate, can be obtained.

Known phosphorus-based compounds that have been used as antioxidants in polycarbonate resins may each be used as the phosphorus-based compound (D). When a phosphorus-based compound having a phosphite structure among those known phosphorus-based compounds is selected, a molded article that is suppressed in color tone change and is excellent in transparency can be obtained.

The phosphorus-based compound having a phosphite structure is a trivalent phosphorus-based compound represented by the general formula "$P(OR^d)_3$" where $R^d$ represents a monovalent or divalent organic group.

Examples of such phosphite compound include triphenyl phosphite, tris(monononylphenyl) phosphite, tris(mononyl/dinonyl-phenyl) phosphite, tris(2,4-di-tert-butylphenyl) phosphite, monooctyldiphenyl phosphite, dioctylmonophenyl phosphite, monodecyldiphenyl phosphite, didecylmonophenyl phosphite, tridecyl phosphite, trilauryl phosphite, tristearyl phosphite, distearylpentaerythritol diphosphite, bis(2,4-di-tert-butyl-4-methylphenyl)pentaerythritol phosphite, bis(2,6-di-tert-butylphenyl)octyl phosphite, 2,2-methylenebis(4,6-di-tert-butylphenyl)octyl phosphite, tetrakis(2,4-di-tert-butylphenyl)-4,4'-biphenylene-diphosphite, and 6-[3-(3-tert-butyl-hydroxy-5-methylphenyl)propoxy]-2,4,8,10-tetra-tert-butyldibenzo[d,f][1,3,2]-dioxaphosphepine.

Among such phosphite compounds, an aromatic phosphite compound represented by the following formula (2) or (3) is more preferred because the compound can further improve the color tone of the aromatic polycarbonate resin composition of the present invention:

(2)

wherein, in the formula (2), $R^1$, $R^2$, and $R^3$ may be identical to or different from each other, and each represent an aryl group having 6 or more and 30 or less carbon atoms;

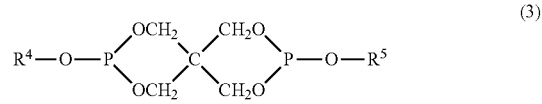

(3)

wherein, in the formula (3), $R^4$ and $R^5$ may be identical to or different from each other, and each represent an aryl group having 6 or more and 30 or less carbon atoms.

The phosphite compound represented by the formula (2) is preferably, for example, triphenyl phosphite, tris(monononylphenyl) phosphite, or tris(2,4-di-tert-butylphenyl) phosphite, more preferably tris(2,4-di-tert-butylphenyl) phosphite. Specific examples of such organic phosphite compound include "ADK STAB 1178" manufactured by ADEKA Corporation, "SUMILIZER TNP" manufactured by Sumitomo Chemical Company, Limited, "JP-351" manufactured by Johoku Chemical Co., Ltd., "ADK STAB 2112" manufactured by ADEKA Corporation, "Irgafos 168" manufactured by BASF, and "JP-650" manufactured by Johoku Chemical Co., Ltd.

The phosphite compound represented by the formula (3) is particularly preferably a compound having a pentaerythritol diphosphite structure, such as bis(2,4-di-tert-butyl-4-methylphenyl)pentaerythritol diphosphite, bis(2,6-di-tert-butyl-4-methylphenyl)pentaerythritol diphosphite, or bis(2,4-dicumylphenyl)pentaerythritol diphosphite. Preferred specific examples of such organic phosphite compound may include "ADK STAB PEP-24G" and "ADK STAB PEP-36" manufactured by ADEKA Corporation, and "Doverphos S-9228" manufactured by Dover Chemical Corporation.

As the other phosphorus-based compound, a phosphine compound, such as triphenylphosphine, may be used. A specific example thereof may be "JC263" manufactured by Johoku Chemical Co., Ltd.

The above-mentioned phosphorus-based compound is still more preferably at least one selected from bis(2,4-dicumylphenyl)pentaerythritol diphosphite, bis(2,6-di-tert-butyl-4-methylphenyl)pentaerythritol diphosphite, and tris (2,4-di-tert-butylphenyl) phosphite.

Those phosphorus-based compounds may be incorporated alone or in any combination thereof.

The content of the phosphorous-based compound (D) is from 0.005 part by mass to 1 part by mass, preferably from 0.01 part by mass to 0.5 part by mass, more preferably from 0.02 part by mass to 0.3 part by mass with respect to 100 parts by mass of the aromatic polycarbonate resin (A). A case in which the content is less than 0.005 part by mass is not preferred because the initial YI value of the molded body reduces, and a case in which the content is more than 1 part by mass is not preferred because the long-term heat resistance and long-term moist heat resistance thereof reduce.

<Additives and the Like>

In addition to the above-mentioned components (A) to (D), various additives may be incorporated into the aromatic polycarbonate resin composition of the present invention to the extent that its transparency and color tone are not adversely affected. Examples of those additives may include a UV absorber, a light stabilizer, a lubricant, an antistatic agent, and a flame retardant.

A benzophenone-based, benzotriazole-based, hydroxyphenyltriazine-based, cyclic imino ester-based, or cyanoacrylate-based UV absorber may be used as the UV absorber. Examples of the benzophenone-based UV absorber include 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxytrihydride benzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodium sulfoxybenzophenone, bis(5-benzoyl-4-hydroxy-2-methoxyphenyl)methane, 2-hydroxy-4-n-dodecyloxybenzophenone, and 2-hydroxy-4-methoxy-2'-carboxybenzophenone.

Examples of the benzotriazole-based UV absorber may include 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2H-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl) benzotriazole, 2-(2-hydroxy-4-octoxyphenyl) benzotriazole, 2,2'-methylenebis(4-cumyl-6-benzotriazolephenyl), 2,2'-p-phenylenebis(1,3-benzoxazin-4-one), 2-[2-hydroxy-3-(3,4,5,6-tetrahydrophthalimidomethyl)-5-methylphenyl] benzotriazole, and polymers each having a 2-hydroxyphenyl-2H-benzotriazole skeleton, such as a copolymer of 2-(2'-hydroxy-5-methacryloxyethylphenyl)-2H-benzotriazole and a vinyl-based monomer copolymerizable with the monomer, and a copolymer of 2-(2'-hydroxy-5-acryloxyethylphenyl)-2H-benzotriazole and a vinyl-based monomer copolymerizable with the monomer.

Examples of the hydroxyphenyltriazine-based UV absorber include 2-(4,6-diphenyl-1,3,5-triazin-2-yl)-5-hexyloxyphenol, 2-(4,6-diphenyl-1,3,5-triazin-2-yl)-5-methyloxyphenol, 2-(4,6-diphenyl-1,3,5-triazin-2-yl)-5-ethyloxyphenol, 2-(4,6-diphenyl-1,3,5-triazin-2-yl)-5-propyloxyphenol, and 2-(4,6-diphenyl-1,3,5-triazin-2-yl)-5-butyloxyphenol. Examples thereof may also include compounds in which a phenyl group of each of the compounds listed above is changed to a 2,4-dimethylphenyl group, such as 2-(4,6-bis(2,4-dimethylphenyl)-1,3,5-triazin-2-yl)-5-hexyloxyphenol.

Examples of the cyclic imino ester-based UV absorber may include 2,2'-p-phenylenebis(3,1-benzoxazin-4-one), 2,2'-m-phenylenebis(3,1-benzoxazin-4-one), and 2,2'-p,p'-diphenylenebis(3,1-benzoxazin-4-one).

Examples of the cyanoacrylate-based UV absorber may include 1,3-bis-[(2'-cyano-3',3'-diphenylacryloyl)oxy]-2,2-bis[(2-cyano-3,3-diphenylacryloyl)oxy]m ethylpropane and 1,3-bis-[(2-cyano-3,3-diphenylacryloyl)oxy]benzene.

The UV absorber may be a polymer-type UV absorber that has the structure of a radical-polymerizable monomer compound, and that is obtained by copolymerizing such UV-absorbable monomer and a monomer such as an alkyl (meth)acrylate. Compounds containing, in the ester substituents of (meth)acrylic acid esters, a benzotriazole skeleton, a benzophenone skeleton, a triazine skeleton, a cyclic imino ester skeleton, and a cyanoacrylate skeleton are each suitable as such UV-absorbable monomer. The UV absorbers may be used alone or in combination thereof. The benzophenone-based UV absorber and the benzotriazole-based UV absorber are preferably used as the UV absorbers, and it is preferred that the benzophenone-based UV absorber and the benzotriazole-based UV absorber be each used alone, or be used in combination.

Among the various UV absorbers, 2,2'-p,p'-diphenylenebis(3,1-benzoxazin-4-one) is particularly preferably used.

The lubricant is, for example, a compound selected from the compound group consisting of an aliphatic hydrocarbon, a polyolefin-based wax, a higher carboxylic acid, a higher carboxylic acid metal salt, a fatty acid amide, a fatty acid ester, a higher alcohol, and the like. Examples of the aliphatic hydrocarbon include ligroin, paraffin oil, mineral oil, and liquid paraffin. Examples of the polyolefin-based wax include a paraffin wax, a polyethylene wax, a polypropylene wax, an ethylene-vinyl acetate copolymer wax, and a polyolefin ionomer-based wax. Examples of the higher carboxylic acid may include stearic acid, valeric acid, caproic acid, capric acid, lauric acid, myristic acid, palmitic acid, arachic acid, behenic acid, lignoceric acid, cerotic acid, melissic acid, tetratriacontanoic acid, glutaric acid, adipic acid, azelaic acid, naphthenic acid, rosin acid, oleic acid, linoleic acid, and linolenic acid. Examples of the higher carboxylic acid metal salt may include a stearic acid alkali metal salt, calcium stearate, zinc stearate, magnesium stearate, and lead stearate. Examples of the fatty acid amide include stearamide, oleamide, erucamide, ethylenebis stearamide, methylenebisstearamide, and ethylenebisoleamide. Examples of the fatty acid ester may include: esters of higher carboxylic acids and monohydric alcohols, such as butyl stearate; and esters of higher carboxylic acids and polyhydric alcohols, such as ethylene glycol monostearate, glycerin monostearate, trimethylolpropane monostearate, pentaerythritol monostearate, pentaerythritol monolaurate, pentaerythritol distearate, glycerin dilaurate, glycerin tristearate, trimethylolpropane distearate, glycerin distearate, glycerin tribehenate, pentaerythritol tristearate, trimethylolpropane tricaprate, trimethylolpropane dioleate, and pentaerythritol tetrastearate. An example of the higher alcohol may be stearyl alcohol.

In particular, the polycarbonate resin composition of the present invention preferably includes glycerin monostearate. The use of glycerin monostearate makes the composition excellent in releasability at the time of its molding. The content of glycerin monostearate is preferably from 0.01 part by mass to 0.05 part by mass with respect to 100 parts by mass of the aromatic polycarbonate resin (A). When the content is 0.01 part by mass or more, even in the case where the thickness of the molded body is 1 mm or more, the molded body can be removed from a mold without the occurrence of a crack or the like in its surface. Meanwhile, when glycerin monostearate is added, the long-term heat resistance of the composition tends to reduce. Accordingly, from the viewpoint of maintaining the color tone of the composition even at the time of its long-term holding under high temperature, the content is preferably 0.05 part by mass or less, more preferably 0.04 part by mass or less, still more preferably 0.03 part by mass or less.

Examples of the antistatic agent include: organic sulfonic acid phosphonium salts, such as aryl sulfonic acid phosphonium salts typified by a dodecylbenzenesulfonic acid phosphonium salt and an alkyl sulfonic acid phosphonium salt; and boric acid phosphonium salts, such as a tetrafluoroboric acid phosphonium salt. In addition, examples thereof include organic sulfonic acid alkali (alkaline earth) metal salts, such as an organic sulfonic acid lithium salt, an organic sulfonic acid sodium salt, an organic sulfonic acid potassium salt, an organic sulfonic acid cesium salt, an organic sulfonic acid rubidium salt, an organic sulfonic acid calcium salt, an organic sulfonic acid magnesium salt, and an organic sulfonic acid barium salt.

The flame retardant is not particularly limited as long as the flame retardant does not adversely affect the transparency of the aromatic polycarbonate resin composition of the present invention including the aromatic polycarbonate resin (A), and the color tone thereof under a high-temperature and high-humidity environment. Known flame retardants, such as an organometallic salt compound, an inorganic silicic acid and a silicate compound thereof, a phosphoric acid ester-based compound, a bromine-based compound, a triazine-based compound, and a polyorganosiloxane-based compound, may each be used as the flame retardant. A Teflon (trademark) resin may be preferably used as a flame retardant auxiliary to be used in combination with the flame retardant.

In the polycarbonate-based resin composition of the present invention, it is required that a difference between a YI value of a 5-millimeter thick molded body, which is obtained by molding the aromatic polycarbonate resin composition at 320° C., after a lapse of 3,000 hours under an environment at 85° C. and a humidity of 85%, and an initial YI value thereof be 3.0 or less. That is, the composition is excellent in long-term moist heat resistance. The difference is described in more detail in the section "Optical Molded Article".

<Method of Producing Aromatic Polycarbonate Resin Composition>

The aromatic polycarbonate resin composition of the present invention may be obtained as particles such as a pellet after the cooling of the melt-kneaded product of a blend obtained by blending the aromatic polycarbonate resin (A) with predetermined amounts of the respective components (B) to (D), and various additives to be blended as required. The melt-kneading may be performed by a typically used method, for example, by using a ribbon blender, a Henschel mixer, a Banbury mixer, a drum tumbler, a single screw extruder, a double screw extruder, a co-kneader, a multiple screw extruder, or the like. In normal cases, a heating temperature at the time of the melt-kneading is appropriately selected from the range of from about 220° C. to about 300° C.

A molded body of the aromatic polycarbonate resin composition of the present invention may be obtained by using the melt-kneaded product or the resultant resin pellet as a raw material and using a known molding method, such as a hollow molding method, an injection molding method, an injection compression molding method, an extrusion molding method, a vacuum molding method, a blow molding method, a press molding method, an air-pressure molding method, an expansion molding method, a heat bending molding method, a compression molding method, a calender molding method, or a rotational molding method.

The aromatic polycarbonate resin composition of the present invention is excellent in heat resistance, and hence can resist molding at a temperature as high as about 320° C. Accordingly, the composition is suitable for a molding method requiring a molding material to have high flowability, such as the injection molding method. Meanwhile, when the extrusion molding method is adopted, the composition is molded at a temperature as low as from about 220° C. to about 280° C., and hence an optical molded article, such as a sheet or a film, which has higher transparency, is free from yellowing, and has high optical characteristics, can be obtained.

[Optical Molded Article]

A molded body obtained by molding the aromatic polycarbonate resin composition of the present invention is excellent in transparency and color tone because the initial YI value of a 5-millimeter thick molded body obtained by molding the composition at 320° C. can be set to 1.1 or less. When the initial YI value of the 5-millimeter thick molded body becomes 1.2, the difference is as small as 0.1, but causes a large difference as described below at the time of the use of the molded body as, for example, a light-guiding plate. Light may pass through a portion having a length of from 10 cm to 15 cm in the light-guiding plate. Even when the difference in initial YI value of the 5-millimeter thick molded body is 0.1, in the case where the thickness of the molded body becomes as large as from 10 cm to 15 cm, its transparency and color tone are largely affected. As described above, a color tone change (ΔYI) obtained by comparing the YI value of the 5-millimeter thick molded body, which is obtained by molding the aromatic polycarbonate resin composition of the present invention at 320° C., after the lapse of 3,000 hours under the environment at 85° C. and a humidity of 85%, and the initial YI value thereof to each other is as low as 3.0 or less, and hence the molded body has such a characteristic as to be excellent in long-term moist heat resistance. The ΔYI of the 5-millimeter thick molded body molded at 320° C. is preferably 2.9 or less, more preferably 2.8 or less.

In addition, a color tone change (ΔYI) obtained by comparing the YI value of the 5-millimeter thick molded body molded at 320° C. after the lapse of 3,000 hours at 120° C. and the initial YI value thereof to each other can be suppressed to 4.0 or less. The molded body may be suitably used as an optical molded article, in particular, an optical molded article to be used under a high-temperature and high-humidity environment, such as a light-guiding plate or a lens, through the exploitation of such characteristic. Further, the molded body is suitably used as a light-guiding plate or lens for a vehicle, such as an automobile, a railway vehicle, or a motorized bicycle, to be used under a high-temperature and high-humidity environment.

In particular, the molded body obtained by molding the aromatic polycarbonate resin composition of the present invention is preferably a molded body having a thickness of 1 mm or more because an excellent effect can be obtained. The thickness of the molded body is more preferably 3 mm or more, still more preferably 5 mm or more.

In the present invention, the term "molded article having a thickness of 1 mm or more" refers to the following thicknesses: when the molded article is a flat plate-like molded article, a wavy plate-like molded article, or a plate-like molded article having unevenness, curvature, or the like, the term refers to the thickness of the plate-like molded article; and when the molded article has a shape that is not a plate shape, such as a round bar shape or a complicated shape, the term refers to the average thickness of the molded article obtained by dividing the volume of the molded article by its area projected on a mold in an injection direction at the time of its injection molding. The upper limit value of the thickness of the molded article having a thickness of 1 mm or more is typically 20 cm or less, preferably 15 cm or less, more preferably 100 mm or less, still more preferably 70 mm or less.

In the present invention, the initial YI value of the 5-millimeter thick molded body is obtained by measuring the YI value of a 5-millimeter thick flat plate-like test piece with a spectrophotometer ("U-4100" manufactured by Hitachi High-Technologies Corporation) under the conditions of a C light source and a two-degree field of view.

EXAMPLES

The present invention is described by way of Examples, but the present invention is not limited to these Examples. Raw material components used in Examples and Comparative Examples are as described below.

Aromatic Polycarbonate Resin (A)

(A1): "TARFLON FN1500" (manufactured by Formosa Idemitsu Petrochemical Corporation, bisphenol A polycarbonate resin, viscosity-average molecular weight (Mv)=14,200)

(A2): "TARFLON FN1700" (manufactured by Formosa Idemitsu Petrochemical Corporation, bisphenol A polycarbonate resin, viscosity-average molecular weight (Mv)=17,700)

(A3): "TARFLON FN1200" (manufactured by Formosa Idemitsu Petrochemical Corporation, bisphenol A polycarbonate resin, viscosity-average molecular weight (Mv)=11,500)

Alicyclic Epoxy Compound (B)

(B1): "CELLOXIDE 2021P" (manufactured by Daicel Corporation, 3,4-epoxycyclohexylmethyl-3',4'-epoxycyclohexane carboxylate)

Polyether Compound (C) Having Polyoxyalkylene Structure (C1): PEG-PPG "UNILUB 50DE-25" (manufactured by NOF Corporation, polyoxyethylene glycol-polyoxypropylene glycol)

(C2): PEG-PTMG "POLYCERIN DC-1100" (manufactured by NOF Corporation, polyoxytetramethylene glycol-polyoxyethylene glycol) (C3): PEG "PEG #1000" (manufactured by NOF Corporation, polyethylene glycol) (C4): PPG "UNIOL D-1000" (manufactured by NOF Corporation, polypropylene glycol)

Phosphorus-Based Compound (D)

(D1): "Doverphos S-9228PC" (manufactured by Dover Chemical Corporation, bis(2,4-dicumylphenyl)pentaerythritol diphosphite)

(D2): "ADK STAB PEP-36" (manufactured by ADEKA Corporation, bis(2,6-di-tert-butyl-4-methylphenyl)pentaerythritol diphosphite)

(D3): "ADK STAB 2112" (manufactured by ADEKA Corporation, tris(2,4-di-tert-butylphenyl) phosphite)

(D4): "JC263" (manufactured by Johoku Chemical Co., Ltd., triphenylphosphine)

Other Additive

Glycerin monostearate: (manufactured by Riken Vitamin Co., Ltd., RIKEMAL S-100A)

Examples 1 to 25 and Comparative Examples 1 to 12

The respective components were mixed at ratios shown in Table 1 or Table 2, and were then melt-kneaded with a vented single screw extruder having a screw diameter of 40 mm ("VS-40" manufactured by Tanabe Plastics Machinery Co., Ltd.) at a cylinder temperature of 250° C., followed by strand cutting. Thus, a pellet was obtained. The resultant pellet was dried at 110° C. for 5 hours, and then a molded body was produced and subjected to various evaluations by the following methods.

[Initial YI Value of Molded Body]

The pellet after the drying was molded into a flat plate-like test piece (molded body (1)) measuring 50 mm by 90 mm by 5 mm thick with an injection molding machine ("ES-1000" manufactured by Nissei Plastic Industrial Co., Ltd.) by an injection molding method at a cylinder temperature of 320° C. and a mold temperature of 80° C. for a cycle time of 50 seconds.

The YI value (initial YI value: $YI_1$) of the resultant test piece was measured with a spectrophotometer ("U-4100" manufactured by Hitachi High-Technologies Corporation) under the conditions of a C light source and a two-degree field of view. The results are shown in Tables 1 and 2. An acceptance criterion is as follows: the $YI_1$ is 1.1 or less. As an evaluation, a case in which the $YI_1$ was 1.1 or less and more than 1.0 was indicated by Symbol "B", a case in which the $YI_1$ was 1.0 or less was indicated by Symbol "A", and a case in which the $YI_1$ was more than 1.1 was indicated by Symbol "X". Symbols "A" and "B" each mean that the $YI_1$ is an excellent YI value that satisfies the acceptance criterion, and Symbol "X" means that the $YI_1$ is a YI value that does not satisfy the acceptance criterion.

[Heat Resistance Test of Molded Body]

The flat plate-like test piece after the measurement of the $YI_1$ was placed in a Geer oven ("GPS-222" manufactured by Tabai Espec Corporation) adjusted to a temperature of 120°

C. for 3,000 hours. The YI value (YI$_2$) of the test piece after the test was measured in the same manner as that described above, and a difference ΔYI (YI$_2$–YI$_1$) was determined. The results are shown in Tables 1 and 2. An acceptance criterion for the heat resistance test is as follows: the ΔYI (YI$_2$–YI$_1$) is 4.0 or less. As an evaluation, a case in which the ΔYI (YI$_2$–YI$_1$) was 4.0 or less and 3.0 or more was indicated by Symbol "B", a case in which the ΔYI (YI$_2$–YI$_1$) was less than 3.0 was indicated by Symbol "A", and a case in which the ΔYI (YI$_2$–YI$_1$) was more than 4.0 was indicated by Symbol "X". Symbols "A" and "B" each mean that the ΔYI is an excellent ΔYI value that satisfies the acceptance criterion, and Symbol "X" means that the ΔYI is a ΔYI value that does not satisfy the acceptance criterion.

[Moist Heat Resistance Test of Molded Body]

The flat plate-like test piece after the measurement of the YI$_1$ was placed in a thermo-hygrostat ("LH33-12P" manufactured by Nagano Science Co., Ltd.) set to a temperature of 85° C. and a relative humidity of 85% for 3,000 hours. The YI value (YI$_3$) of the test piece after the test was measured in the same manner as that described above, and a difference ΔYI (YI$_3$–YI$_1$) was determined. The results are shown in Tables 1 and 2. An acceptance criterion for the moist heat resistance test is as follows: the ΔYI (YI$_3$–YI$_1$) is 3.0 or less. As an evaluation, a case in which the ΔYI (YI$_3$–YI$_1$) was 3.0 or less and 2.0 or more was indicated by Symbol "B", a case in which the ΔYI (YI$_3$–YI$_1$) was less than 2.0 was indicated by Symbol "A", and a case in which the ΔYI (YI$_3$–YI$_1$) was more than 3.0 was indicated by Symbol "X". Symbols "A" and "B" each mean that the ΔYI is an excellent ΔYI value that satisfies the acceptance criterion, and Symbol "X" means that the ΔYI is a ΔYI value that does not satisfy the acceptance criterion.

TABLE 1

| | | | Example | | | | | | | | | |
|---|---|---|---|---|---|---|---|---|---|---|---|---|
| | | | 1 | 2 | 3 | 4 | 5 | 6 | 7 | 8 | 9 |
| Resin composition (part(s) by mass) | Aromatic PC resin (A) | (A1) FN1500 | 100 | 100 | 100 | 100 | 100 | 100 | 100 | 100 | 100 |
| | | (A2) FN1700 | — | — | — | — | — | — | — | — | — |
| | | (A3) FN1200 | — | — | — | — | — | — | — | — | — |
| | Alicyclic epoxy compound (B) | (B1) CELLOXIDE 2021P | 0.03 | 0.03 | 0.03 | 0.03 | 0.03 | 0.03 | 0.03 | 0.02 | 0.02 |
| | Polyether compound (C) | (C1) UNILUB50DE-25 | 0.20 | 0.40 | 0.60 | 0.20 | 0.40 | 0.40 | 0.40 | 0.60 | 0.60 |
| | | (C2) POLYCERIN DC-1100 | — | — | — | — | — | — | — | — | — |
| | | (C3) PEG#1000 | — | — | — | — | — | — | — | — | — |
| | | (C4) UNIOL D-1000 | — | — | — | — | — | — | — | — | — |
| | Phosphorus-based compound (D) | (D1) Doverphos S-9228PC | 0.05 | 0.05 | 0.05 | — | — | 0.025 | 0.025 | — | — |
| | | (D2) ADK STAB PEP-36 | — | — | — | — | — | 0.025 | — | 0.05 | 0.05 |
| | | (D3) ADK STAB 2112 | — | — | — | 0.05 | 0.05 | — | — | — | — |
| | | (D4) JC263 | — | — | — | — | — | — | 0.025 | — | — |
| | Other additive | RIKEMAL S-100A | — | — | — | — | — | — | — | 0.03 | — |
| Evaluation result | Initial YI value | YI value after molding at 320° C. (YI$_1$) | 1.1 | 1.0 | 1.0 | 1.1 | 1.1 | 1.0 | 1.0 | 1.0 | 1.0 |
| | | Evaluation | B | A | A | B | B | A | A | A | A |
| | Heat resistance | YI value after 3,000 hr at 120° C. (YI$_2$) | 4.2 | 3.9 | 4.1 | 3.8 | 3.6 | 3.8 | 4.4 | 4.2 | 4.2 |
| | | ΔYI (YI$_2$ – YI$_1$) | 3.1 | 2.9 | 3.1 | 2.7 | 2.5 | 2.8 | 3.4 | 3.2 | 3.2 |
| | | Evaluation | B | A | B | A | A | A | B | B | B |
| | Moist heat resistance | YI value after 3,000 hr at 85° C. and humidity of 85% (YI$_3$) | 3.2 | 2.5 | 2.5 | 3.1 | 3.0 | 2.3 | 2.2 | 3.9 | 3.5 |
| | | ΔYI (YI$_3$ – YI$_1$) | 2.1 | 1.5 | 1.5 | 2.0 | 1.9 | 1.3 | 1.2 | 2.9 | 2.5 |
| | | Evaluation | B | A | A | B | A | A | A | B | B |

| | | | Example | | | | | | | | |
|---|---|---|---|---|---|---|---|---|---|---|---|
| | | | 10 | 11 | 12 | 13 | 14 | 15 | 16 | 17 | 18 |
| Resin composition (part(s) by mass) | Aromatic PC resin (A) | (A1) FN1500 | 50 | 50 | 100 | 100 | 100 | 100 | 100 | 100 | — |
| | | (A2) FN1700 | 50 | 50 | — | — | — | — | — | — | — |
| | | (A3) FN1200 | — | — | — | — | — | — | — | — | 100 |
| | Alicyclic epoxy compound (B) | (B1) CELLOXIDE 2021P | 0.02 | 0.02 | 0.03 | 0.03 | 0.03 | 0.03 | 0.03 | 0.03 | 0.03 |
| | Polyether compound (C) | (C1) UNILUB50DE-25 | 0.60 | 0.60 | — | — | — | — | — | — | 0.20 |
| | | (C2) POLYCERIN DC-1100 | — | — | 0.20 | 0.40 | 0.20 | 0.40 | — | — | — |
| | | (C3) PEG#1000 | — | — | — | — | — | — | 0.40 | — | — |
| | | (C4) UNIOL D-1000 | — | — | — | — | — | — | — | 0.40 | — |

TABLE 1-continued

|  |  |  |  |  |  |  |  |  |  |  |
|---|---|---|---|---|---|---|---|---|---|---|
| Phosphorus-based compound (D) | (D1) Doverphos S-9228PC | — | — | 0.05 | 0.05 | — | — | 0.05 | — | — |
|  | (D2) ADK STAB PEP-36 | 0.05 | 0.05 | — | — | — | — | — | — | — |
|  | (D3) ADK STAB 2112 | — | — | — | — | 0.05 | 0.05 | 0.05 | 0.05 | 0.05 |
|  | (D4) JC263 | — | — | — | — | — | — | — | — | — |
| Other additive | RIKEMAL S-100A | — | 0.03 | — | — | — | — | — | — | — |
| Evaluation result | Initial YI value | YI value after molding at 320° C. ($YI_1$) | 1.0 | 1.0 | 1.1 | 1.0 | 1.1 | 1.0 | 1.0 | 1.0 | 1.0 |
|  |  | Evaluation | A | A | B | A | B | A | A | A | A |
|  | Heat resistance | YI value after 3,000 hr at 120° C. ($YI_2$) | 4.8 | 4.7 | 4.5 | 4.4 | 4.7 | 4.8 | 4.5 | 4.4 | 3.8 |
|  |  | $\Delta YI$ ($YI_2 - YI_1$) | 3.8 | 3.7 | 3.4 | 3.4 | 3.6 | 3.8 | 3.5 | 3.4 | 2.8 |
|  |  | Evaluation | B | B | B | B | B | B | B | B | A |
|  | Moist heat resistance | YI value after 3,000 hr at 85° C. and humidity of 85% ($YI_3$) | 3.8 | 3.9 | 2.9 | 2.8 | 2.6 | 2.7 | 2.8 | 2.6 | 2.9 |
|  |  | $\Delta YI$ ($YI_3 - YI_1$) | 2.8 | 2.9 | 1.8 | 1.8 | 1.5 | 1.7 | 1.8 | 1.6 | 1.9 |
|  |  | Evaluation | B | B | A | A | A | A | A | A | A |

|  |  |  |  | Example |  |  |  |  |  |  |
|---|---|---|---|---|---|---|---|---|---|---|
|  |  |  |  | 19 | 20 | 21 | 22 | 23 | 24 | 25 |
| Resin composition (part(s) by mass) | Aromatic PC resin (A) | (A1) FN1500 | 100 | 100 | 100 | — | 100 | 100 | 100 |
|  |  | (A2) FN1700 | — | — | — | 100 | — | — | — |
|  |  | (A3) FN1200 | — | — | — | — | — | — | — |
|  | Alicyclic epoxy compound (B) | (B1) CELLOXIDE 2021P | 0.10 | 0.03 | 0.03 | 0.02 | 0.01 | 0.03 | 0.03 |
|  | Polyether compound (C) | (C1) UNILUB50DE-25 | 0.20 | 0.20 | 0.40 | 0.60 | 0.20 | — | — |
|  |  | (C2) POLYCERIN DC-1100 | — | — | — | — | — | — | — |
|  |  | (C3) PEG#1000 | — | — | — | — | — | 0.40 | — |
|  |  | (C4) UNIOL D-1000 | — | — | — | — | — | — | 0.40 |
|  | Phosphorus-based compound (D) | (D1) Doverphos S-9228PC | 0.05 | 0.25 | 0.05 | — | 0.05 | 0.05 | 0.05 |
|  |  | (D2) ADK STAB PEP-36 | — | — | — | 0.05 | — | — | — |
|  |  | (D3) ADK STAB 2112 | — | — | — | — | — | — | — |
|  |  | (D4) JC263 | — | — | — | — | — | — | — |
|  | Other additive | RIKEMAL S-100A | — | — | 0.03 | — | — | — | — |
| Evaluation result | Initial YI value | YI value after molding at 320° C. ($YI_1$) | 1.0 | 1.0 | 1.0 | 1.1 | 1.1 | 1.0 | 1.0 |
|  |  | Evaluation | A | A | A | B | B | A | A |
|  | Heat resistance | YI value after 3,000 hr at 120° C. ($YI_2$) | 4.5 | 4.4 | 4.6 | 4.6 | 4.8 | 4.5 | 4.5 |
|  |  | $\Delta YI$ ($YI_2 - YI_1$) | 3.5 | 3.4 | 3.6 | 3.5 | 3.7 | 3.5 | 3.5 |
|  |  | Evaluation | B | B | B | B | B | B | B |
|  | Moist heat resistance | YI value after 3,000 hr at 85° C. and humidity of 85% ($YI_3$) | 2.5 | 2.5 | 2.6 | 4.0 | 3.7 | 2.9 | 2.7 |
|  |  | $\Delta YI$ ($YI_3 - YI_1$) | 1.5 | 1.5 | 1.6 | 2.9 | 2.6 | 1.9 | 1.7 |
|  |  | Evaluation | A | A | A | B | B | A | A |

TABLE 2

| | | | Comparative Example | | | | | |
|---|---|---|---|---|---|---|---|---|
| | | | 1 | 2 | 3 | 4 | 5 | 6 |
| Resin composition (part(s) by mass) | Aromatic PC resin (A) | (A1) FN1500 | 100 | 100 | 100 | 100 | 100 | 100 |
| | | (A2) FN1700 | — | — | — | — | — | — |
| | Alicyclic epoxy compound (B) | (B1) CELLOXIDE 2021P | — | 0.03 | 0.03 | 0.03 | — | — |
| | Polyether compound (C) | (C1) UNILUB50 DE-25 | — | — | — | — | — | 0.6 |
| | | (C2) POLYCERIN DC-1100 | — | — | — | — | — | — |
| | | (C3) PEG#1000 | — | — | — | — | — | — |
| | | (C4) UNIOL D-1000 | — | — | — | — | 0.3 | — |
| | Phosphorus-based compound (D) | (D1) Doverphos S-9228PC | — | — | — | 0.05 | — | — |
| | | (D2) ADK ST AB PEP-36 | 0.05 | 0.05 | — | — | 0.05 | 0.05 |
| | | (D3) ADK ST AB 2112 | — | — | 0.05 | — | — | — |
| | Other additive | RIKEMAL S-100A | — | — | — | — | — | — |
| Evaluation result | Initial YI value | YI value after molding at 320° C. ($YI_1$) | 1.2 | 1.3 | 1.4 | 1.2 | 1.1 | 1.1 |
| | | Evaluation | X | X | X | X | B | B |
| | Heat resistance | YI value after 3,000 hr at 120° C. ($YI_2$) | 7.9 | 4.7 | 3.8 | 4.0 | 13.1 | 11.1 |
| | | $\Delta YI$ ($YI_2 - YI_1$) | 6.7 | 3.4 | 2.4 | 2.8 | 12.0 | 10.0 |
| | | Evaluation | X | B | A | A | X | X |
| | Moist heat resistance | YI value after 3,000 hr at 85° C. and humidity of 85% ($YI_3$) | 9.0 | 3.5 | 4.0 | 2.6 | 17.6 | 17.3 |
| | | $\Delta YI$ ($YI_3 - YI_1$) | 7.8 | 2.2 | 2.6 | 1.4 | 16.5 | 16.2 |
| | | Evaluation | X | B | B | A | X | X |

| | | | Comparative Example | | | | | |
|---|---|---|---|---|---|---|---|---|
| | | | 7 | 8 | 9 | 10 | 11 | 12 |
| Resin composition (part(s) by mass) | Aromatic PC resin (A) | (A1) FN1500 | 100 | 100 | 100 | 50 | 100 | 100 |
| | | (A2) FN1700 | — | — | — | 50 | — | — |
| | Alicyclic epoxy compound (B) | (B1) CELLOXIDE 2021P | — | 0.02 | 0.02 | 0.02 | 0.03 | 0.03 |
| | Polyether compound (C) | (C1) UNILUB 50DE-25 | 1.2 | 0.8 | 0.8 | 0.8 | 0.1 | 0.4 |
| | | (C2) POLYCERIN DC-1100 | — | — | — | — | — | — |
| | | (C3) PEG#1000 | — | — | — | — | — | — |
| | | (C4) UNIOL D-1000 | — | — | — | — | — | — |
| | Phosphorus-based compound (D) | (D1) Doverphos S-9228PC | — | — | 0.05 | — | — | — |
| | | (D2) ADK ST AB PEP-36 | — | 0.05 | — | 0.05 | 0.05 | 1.5 |
| | | (D3) ADK ST AB 2112 | 0.08 | — | — | — | — | — |
| | Other additive | RIKEMAL S-100A | — | — | — | — | — | — |
| Evaluation result | Initial YI value | YI value after molding at 320° C. ($YI_1$) | 1.1 | 1.0 | 1.0 | 1.0 | 1.2 | 1.0 |
| | | Evaluation | B | A | A | A | X | A |
| | Heat resistance | YI value after 3,000 hr at 120° C. ($YI_2$) | 14.1 | 6.1 | 5.1 | 5.1 | 4.5 | 5.9 |
| | | $\Delta YI$ ($YI_2 - YI_1$) | 13.0 | 5.1 | 4.1 | 4.1 | 3.3 | 4.9 |
| | | Evaluation | X | X | X | X | B | X |
| | Moist heat resistance | YI value after 3,000 hr at 85° C. and humidity of 85% ($YI_3$) | 17.1 | 3.3 | 3.2 | 3.0 | 3.3 | 5.0 |
| | | $\Delta YI$ ($YI_3 - YI_1$) | 16.0 | 2.3 | 2.2 | 2.0 | 2.1 | 4.0 |
| | | Evaluation | X | B | B | B | B | X |

It is shown from the results of Table 1 that the 5-millimeter thick molded body obtained by molding the aromatic polycarbonate resin composition of the present invention at 320° C. has an initial YI value ($YI_1$) of 1.1 or less, and is hence excellent in initial color tone. In addition, it is shown that the difference $\Delta YI$ ($YI_2-YI_1$) between the YI value ($YI_2$) after 3,000 hr at 120° C. and the initial YI value ($YI_1$) is 4.0 or less, and hence the molded body is excellent in heat resistance. Further, it is shown that, with regard to the YI value ($YI_3$) after 3,000 hr at 85° C. and a humidity of 85%, the difference $\Delta YI$ ($YI_3-YI_1$) between the $YI_3$ and the initial YI value ($YI_1$) is 3.0 or less, and hence the molded body is excellent in moist heat resistance.

It is shown from the results of Table 2 that, in each of Comparative Examples 1 to 4, the polyether compound (C) is not incorporated, and hence the molded body has an initial YI value ($YI_1$) of more than 1.1, thereby being poor in color tone and transparency. It is found that, in each of Comparative Examples 5 to 7, the alicyclic epoxy compound (B) is not incorporated, and hence the difference $\Delta YI$ ($YI_2-YI_1$) between the YI value ($YI_2$) after 3,000 hr at 120° C. and the initial YI value ($YI_1$), and the difference $\Delta YI$ ($YI_3-YI_1$) between the YI value ($YI_3$) after 3,000 hr at 85° C. and a humidity of 85%, and the initial YI value ($YI_1$) become extremely high to largely reduce the long-term heat resistance and long-term moist heat resistance of the molded body. Comparative Examples 8 to 10 are comparative examples each showing a case in which the content of the polyether compound (C) is more than 0.6 part by mass. It is found that, when the content of the polyether compound (C) is more than 0.6 part by mass, the difference $\Delta YI$ ($YI_2-YI_1$) between the YI value ($YI_2$) after 3,000 hr at 120° C. and the initial YI value ($YI_1$) becomes more than 4 to reduce the heat resistance of the molded body. It is found from Comparative Example 11 that, when the content of the polyether compound (C) is less than 0.2 part by mass, the molded body has an initial YI value ($YI_1$) of more than 1.1, and is hence poor in color tone and transparency. It is found from Comparative Example 12 that, when the content of the phosphorus-based compound (D) is more than 1 part by mass, the difference $\Delta YI$ ($YI_2-YI_1$) between the YI value ($YI_2$) after 3,000 hr at 120° C. and the initial YI value ($YI_1$) becomes more than 4.0 to reduce the long-term heat resistance of the molded body, and the difference $\Delta YI$ ($YI_3-YI_1$) between the YI value ($YI_3$) after 3,000 hr at 85° C. and a humidity of 85%, and the initial YI value ($YI_1$) becomes more than 3.0 to make the molded body poor in long-term moist heat resistance.

INDUSTRIAL APPLICABILITY

The molded body formed of the aromatic polycarbonate resin composition of the present invention is excellent in initial YI value after its molding at a temperature of 320° C. or less, long-term heat resistance, and long-term moist heat resistance. The molded body is suitable as optical molded articles, such as a light-guiding part for a vehicle and various light-guiding plates.

The invention claimed is:

1. An aromatic polycarbonate resin composition, comprising, with respect to 100 parts by mass of an aromatic polycarbonate resin (A), 0.03 part by mass to 0.1 part by mass or less of an alicyclic epoxy compound (B), 0.2 part by mass to 0.6 part by mass of a polyether compound (C), 0.005 part by mass to 1 part by mass of a phosphorus-based compound (D),
wherein the polyether compound (C) comprises at least one selected from a polyoxyethylene glycol-polyoxypropylene glycol and a polyoxytetramethylene glycol-polyoxyethylene glycol, wherein the phosphorus-based compound (D) comprises a bis(2,6-di-tert-butyl-4-methylphenyl)pentaerythritol diphosphite), and
wherein a difference between a YI value of a 5-millimeter thick molded body, which is obtained by molding the aromatic polycarbonate resin composition at 320° C., after a lapse of 3,000 hours under an environment at 85° C. and a humidity of 85%, and an initial YI value thereof is less than 2.0 and wherein a difference between a YI value of the 5-millimeter thick molded body molded at 320° C. after a lapse of 3,000 hours at 120° C. and the initial YI value thereof is 4.0 or less.

2. The aromatic polycarbonate resin composition according to claim 1, wherein the aromatic polycarbonate resin (A) comprises a polycarbonate comprising, in a main chain thereof, a repeating unit represented by the following general formula (I):

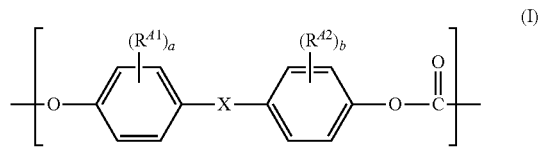

wherein $R^{41}$ and $R^{42}$ each independently represent an alkyl group having 1 to 6 carbon atoms or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and "a" and "b" each independently represent an integer of from 0 to 4.

3. The aromatic polycarbonate resin composition according to claim 1, wherein the aromatic polycarbonate resin (A) has a viscosity-average molecular weight of from 10,000 to 50,000.

4. The aromatic polycarbonate resin composition according to claim 1, wherein the alicyclic epoxy compound (B) comprises 3,4-epoxycyclohexylmethyl-3',4'-epoxycyclohexane carboxylate and/or 1,2-epoxy-4-(2-oxiranyl)cyclohexane adduct of 2,2-bis(hydroxymethyl)-1-butanol.

5. The aromatic polycarbonate resin composition according to claim 1, wherein the polyether compound (C) comprises a polyoxyethylene glycol-polyoxypropylene glycol.

6. The aromatic polycarbonate resin composition according to claim 1, wherein the polyether compound (C) has a number-average molecular weight of from 200 to 10,000.

7. The aromatic polycarbonate resin composition according to claim 1, wherein the phosphorus-based compound (D) further comprises at least one selected from bis(2,4-dicumylphenyl)pentaerythritol diphosphite, and tris(2,4-di-tert-butylphenyl) phosphite.

8. The aromatic polycarbonate resin composition according to claim 1, wherein the initial YI value of the 5-millimeter thick molded body molded at 320° C. is 1.1 or less.

9. The aromatic polycarbonate resin composition according to claim 1, wherein the aromatic polycarbonate resin composition comprises, with respect to 100 parts by mass of the aromatic polycarbonate resin (A), 0.03 part by mass to 0.05 part by mass or less of the alicyclic epoxy compound (B), 0.2 part by mass to 0.5 part by mass of the polyether compound (C), and 0.02 part by mass to 0.3 part by mass of the phosphorus-based compound (D).

10. The aromatic polycarbonate resin composition according to claim 1, wherein the aromatic polycarbonate resin composition comprises, with respect to 100 parts by mass of the aromatic polycarbonate resin (A), 0.03 part by mass to 0.08 part by mass of the alicyclic epoxy compound (B).

11. The aromatic polycarbonate resin composition according to claim 1, further comprising 0.01 part by mass to 0.05 part by mass of glycerin monostearate with respect to 100 parts by mass of the aromatic polycarbonate resin (A).

12. An optical molded article, which is obtained by molding the aromatic polycarbonate resin composition of claim 1.

13. The optical molded article according to claim 12, wherein the optical molded article comprises a light-guiding plate.

14. The optical molded article according to claim 12, wherein the optical molded article has a thickness of from 1 mm to 70 mm.

15. The aromatic polycarbonate resin composition according to claim 1, wherein a difference between a YI value of a 5-millimeter thick molded body, which is obtained by molding the aromatic polycarbonate resin composition at 320° C., after a lapse of 3,000 hours under an environment at 85° C. and a humidity of 85%, and an initial YI value thereof is 1.5 or less.

16. The aromatic polycarbonate resin composition according to claim 1, wherein the composition comprises 0.2 part by mass to 0.4 part by mass of the polyether compound (C) with respect to 100 parts by mass of the aromatic polycarbonate resin (A).

* * * * *